US007120249B2

(12) United States Patent
Roberts

(10) Patent No.: US 7,120,249 B2
(45) Date of Patent: *Oct. 10, 2006

(54) METHODS AND SYSTEMS FOR GENERATING ENCRYPTION KEYS USING RANDOM BIT GENERATORS

(75) Inventor: Paul Cador Roberts, Bury St. Edmunds (GB)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/155,248

(22) Filed: Jun. 17, 2005

(65) Prior Publication Data

US 2006/0005040 A1 Jan. 5, 2006

Related U.S. Application Data

(63) Continuation of application No. 09/761,373, filed on Jan. 16, 2001, now Pat. No. 6,931,128.

(51) Int. Cl.
*H04L 9/00* (2006.01)

(52) U.S. Cl. .................... 380/44; 380/43; 380/284; 380/285; 380/278; 380/283

(58) Field of Classification Search ............... 380/43, 380/284, 28, 5, 44, 278, 279, 283
See application file for complete search history.

(56) References Cited

U.S. PATENT DOCUMENTS

| 3,958,081 | A | * | 5/1976 | Ehrsam et al. ............. 380/29 |
| 4,369,332 | A | * | 1/1983 | Campbell, Jr. ............. 380/43 |
| 4,791,669 | A | * | 12/1988 | Kage ......................... 380/46 |
| 4,985,919 | A | * | 1/1991 | Naruse et al. .............. 380/266 |
| 5,381,481 | A | * | 1/1995 | Gammie et al. ............ 380/212 |
| 5,412,730 | A | * | 5/1995 | Jones ......................... 380/46 |
| 5,428,686 | A | * | 6/1995 | Brown et al. ............... 380/46 |
| 6,240,183 | B1 | * | 5/2001 | Marchant .................... 380/28 |
| 6,327,660 | B1 | * | 12/2001 | Patel ........................ 713/193 |
| 6,357,046 | B1 | * | 3/2002 | Thompson et al. ......... 725/139 |
| 6,931,128 | B1 | * | 8/2005 | Roberts ...................... 380/44 |
| 2002/0159598 | A1 | * | 10/2002 | Rubinstein et al. ........ 380/259 |

FOREIGN PATENT DOCUMENTS

WO WO 98/55717 * 12/1998

OTHER PUBLICATIONS

Schneier, B. "Applied Cryptography, Protocols, Algorithms and Source Code in C". 1996, John Wiley & Sons, Inc. Second Edition, pp. 169-187.*

(Continued)

*Primary Examiner*—Jacques Louis-Jacques
*Assistant Examiner*—Tongoc Tran
(74) *Attorney, Agent, or Firm*—Workman Nydegger

(57) ABSTRACT

A security key, such as an encryption key, is generated so as to make it more difficult for eavesdroppers to identify the key. Specifically, a cryptographically secure random number generator generates a random bit sequence that is included in a seed. This random seed is provided along with a negotiated master secret to a key generation module. The key generation module may implement a pseudo random function that is in accordance with the Transport Layer Security (TLS) protocol or the Wireless Transport Layer Security (WTLS) protocol. This key may then be used to encrypt a plain text message to form an encrypted data packet. The encrypted data packet also includes the random seed in unencrypted form. The encrypted data packet may be transmitted over a public network to a recipient with reduced risk of eavesdropping.

19 Claims, 6 Drawing Sheets

OTHER PUBLICATIONS

Zhou, J., "Further analysis of the Internet Key Exchange Protocol", Computer Communication, Nov. 1, 2000, vol. 23, No. 17, pp. 1606-1612.*

Genmaro, R., et al., "Two-Phrase Cryptographic Key Recovery System," Computer & Security, vol. 16, No. 6, 1997, pp. 481-506.*

Bahie-Eldin et al., "Complexity Measure of Encryption Keys for Securing Computer Networks", IEEE Computer Soc., 1988, pp. 250-255.*

Hughes et al., "Quantum Key Distribution Over a 48 km Optical Fibre Network", Journal of Modern Optics, Feb. 15/Mar. 10, 2000, vol. 47, No. 2/3, pp. 533-547.*

Electronics Letters, Aug. 20, 1981, vol. 17, No. 17, pp. 583-585.*

* cited by examiner

METHODS AND SYSTEMS FOR GENERATING ENCRYPTION KEYS USING RANDOM BIT GENERATORS

CROSS-REFERENCE TO RELATED APPLICATIONS

This application is a continuation of application Ser. No. 09/761,373, filed Jan. 16, 2001, now U.S. Pat. No. 6,931,128 and entitled "METHODS AN SYSTEMS FOR GENERATIGN ENCRYPTION KEYS USING RANDOM BIT GENERATORS" which is incorporated here by reference.

BACKGROUND OF THE INVENTION

1. The Field of the Invention

The present invention relates to the field of secure digital communications. In particular, the present invention relates to methods and systems for automatically generating a security key, such as an encryption key, using a seed that has random bit sequences.

2. Background and Related Art

Computer networks have transformed the way people communicate and do business. Currently, even sensitive communications traverse public networks, such networks including the Internet. Encryption allows such sensitive communication to be transmitted across public networks with a significantly reduced risk that the messages will be intercepted and decrypted by an unauthorized individual.

Encryption involves the use of an encryption key to manipulate data that is generally readable (also called herein "plain text") into data that is generally not readable (also called herein "cipher text"). The cipher text may then be transmitted over a public network that is subject to eavesdropping by unauthorized individuals. The authorized recipient uses a decryption key to decrypt the cipher text back into the plain text so that the data may be properly interpreted. Since the general public ideally does not have access to the decryption key, unauthorized users cannot decipher the cipher text and thus cannot interpret the data.

In symmetric encryption, the encryption key and the decryption key are the same. This previously negotiated secret key is ideally only known to authorized participants in a secure communication. However, given sufficient time, knowledge and processing resources, it is possible for unauthorized eavesdroppers to identify the key and thus decrypt any messages they are able to intercept between the authorized participants to the communication.

To guard against this undesirable interception of secure communications, security protocols such as the Wireless Transport Layer Security (WTLS) protocol have provisions for changing the key on a periodic basis. Thus, even if an eavesdropper manages to identify the key, the eavesdropper will only have access to the secure communications until the key is changed.

In these security protocols, a bit sequence called a "master secret" is securely negotiated between two parties to a secure communications session. The master secret is input, along with a bit sequence called a seed, into a one-way hash algorithm to generate an encryption/decryption key. Since the result of the one-way hash algorithm depends on the input seed, changing the seed on occasion also changes the key on occasion. The seed is transmitted in the clear inside a data packet. The recipient uses the seed and the previously negotiated master secret as inputs to the same one-way hash algorithm to generate the same key that was used to encrypt the packet. Since symmetric encryption is employed, that key is then used to decrypt the packet.

In conventional security protocols, such as WTLS, the seed is essentially a bit sequence that is unique to the client. When the seed is to change, the bit sequence is simply incremented. An eavesdropper may take advantage of the predictable changes in the seed to determine the master secret necessary to form the key needed to eavesdrop. It would represent an improvement in the art to provide an encryption/decryption method and system in which the master secret and key is more difficult for an eavesdropper to identify. It would represent yet a further improvement to reduce the damage caused by an eavesdropper if the eavesdropper were to identify the key despite the difficulty in identifying the key.

SUMMARY OF THE INVENTION

Methods and systems are described for generating a security key such as an encryption key so as to make it more difficult for eavesdroppers to identify the key. Specifically, a cryptographically secure random number generator generates a random bit sequence that is included in a seed. This random seed is provided along with a negotiated master secret to a key generation module. The key generation module may implement a pseudo random function that is in accordance with the Transport Layer Security (TLS) protocol or the Wireless Transport Layer Security (WTLS) protocol. This key may then be used to encrypt a plain text message to form an encrypted data packet. The encrypted data packet also includes the random seed in unencrypted form. The encrypted data packet may be transmitted over a public network to a recipient with reduced risk of eavesdropping.

When the recipient decryption device receives the data packet, the recipient device reads the seed from the data packet and provides the random seed along with the negotiated master secret to a key generation module that is identical to the key generation module used to generate the key for encryption. The resulting key is used to decrypt the data packet.

One advantage of the present invention is that the seed used to generate the key contains a random bit sequence. This makes it more difficult for an eavesdropper to identify the encryption key or master secret to thereby be able to decrypt and successfully intercept a sensitive message.

In one embodiment of the invention, a new random bit sequence is generated for each data packet transmitted from the encryption device to the decryption device. This means that the random seed and thus the encryption key will be different for each data packet. Thus, even if the eavesdropper identifies the encryption key for one data packet, the eavesdropper would not automatically be able to intercept other data packets without having to break another encryption key. Thus, the principles of the present invention not only make it more difficult to break a key, but they also reduce the reward for having broken a key.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to both methods and systems for generating an encryption key using a seed that contains a random bit sequence. The key is generated by inputting the seed as well as a pre-negotiated master secret into a key generation module to generate a key. An encryption module then uses the key to encrypt a data packet. The seed is included in the data packet without encryption. The data packet may then be transmitted to the intended recipient over a public network. Upon receipt of the packet, the recipient then uses the pre-negotiated master secret and the seed read from the data packet as inputs to the same key generation module that was used to generate the decryption key. A decryption module that is symmetric with the encryption module then uses this key to decrypt the data packet. In one embodiment, the key is changed for each data packet by, for each data packet, changing the random bit sequence that is included in the seed.

The lack of predictability in the seed makes it difficult for an eavesdropper to identify the key and the master secret. In addition, changing the seed used for each data packet reduces the damage caused by eavesdropper since even if the eavesdropper identified the key, the key would only be good for one data packet, and would be useless for the next.

The embodiments of the present invention may comprise a special purpose or general purpose computer including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
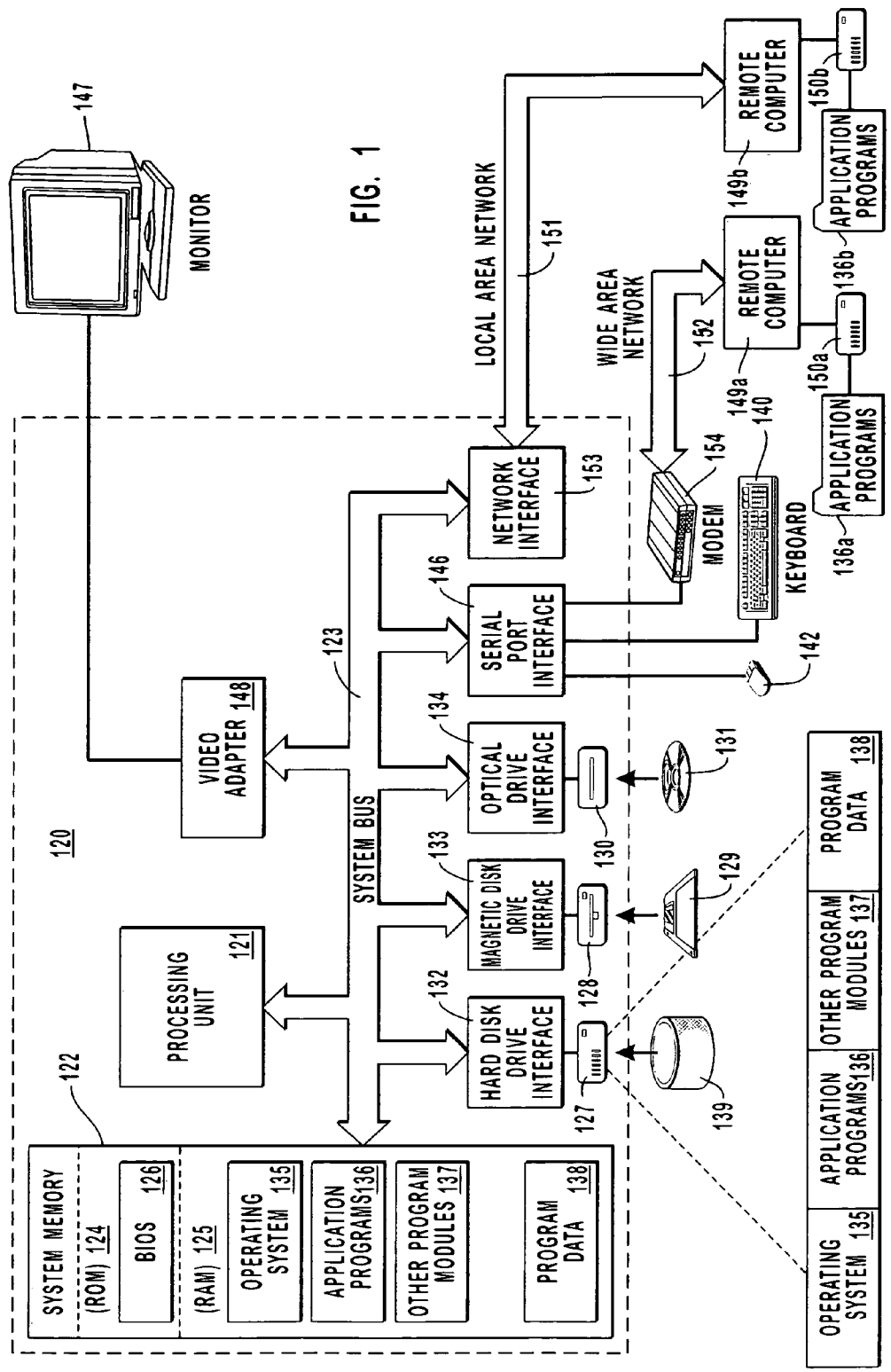
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
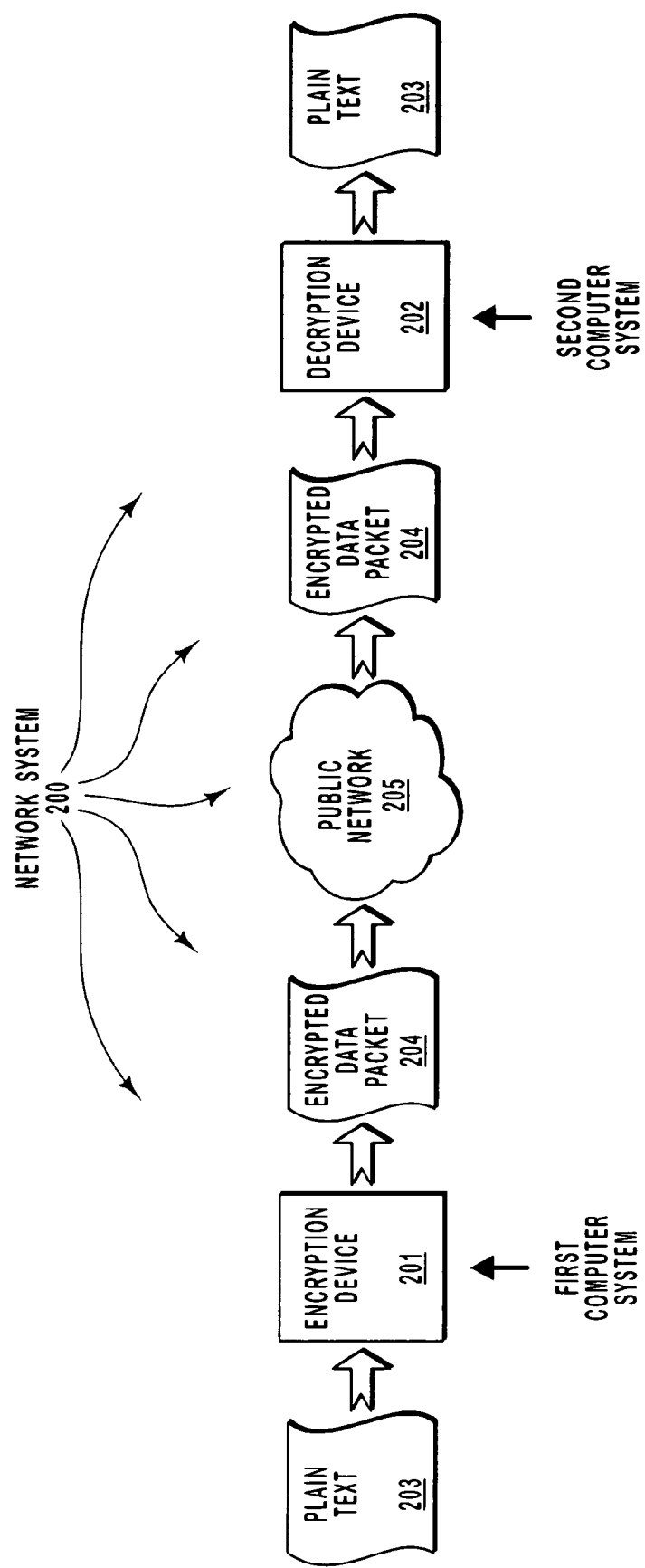
FIG. 2 illustrates an encrypted communication in a network system environment.

FIG. 2 illustrates a network system 200 in which the present invention may operate. The network system 200 includes a first computer system (e.g., encryption device 201) that is that is network connectable to a second computer system (e.g., decryption device 202). In this description and in the claims, "network connectable" mean having the ability to be network connected. Two devices being "network connected" means that one device is able to communicate with the other device either directly or through one or more networks. Thus, "network connected" includes all forms of electronic unidirectional or bi-directional communication whether or not such communication is connection-oriented. In one embodiment, the first and second computer systems are structured similar to the computer 120 described with reference to FIG. 1 although that is not required.

In operation, plain text 203 is encrypted at the first computer system by encryption device 201 into at least one encrypted data packet 204 for communication over public network 205. In this description and in the claims, "plain text" is any data that is readable (and interpretable) by a user or application without decryption and is not limited to text data. The encrypted data packet 204 is then decrypted at the second computer system using decryption device 202 to regenerate plain text 203.

In one embodiment, the data packet 204 is transmitted using a secure unconfirmed push protocol. A "secure unconfirmed push" protocol is defined as any protocol that may be used to transmit a data packet in a secure fashion, without requiring confirmation of the receipt of the data packet, and without requiring that the data be synchronously requested for each transmission. For example, User Datagram Protocol (UDP) is one example of a secure unconfirmed push protocol. In this case, the encrypted data packet 204 may be a UDP packet, the first computer system may be at least part of a server computer system to which the second computer system subscribes for notification of certain events, and the second computer system may be at least part of a client computer system such as a wireless device.

Figure 3:
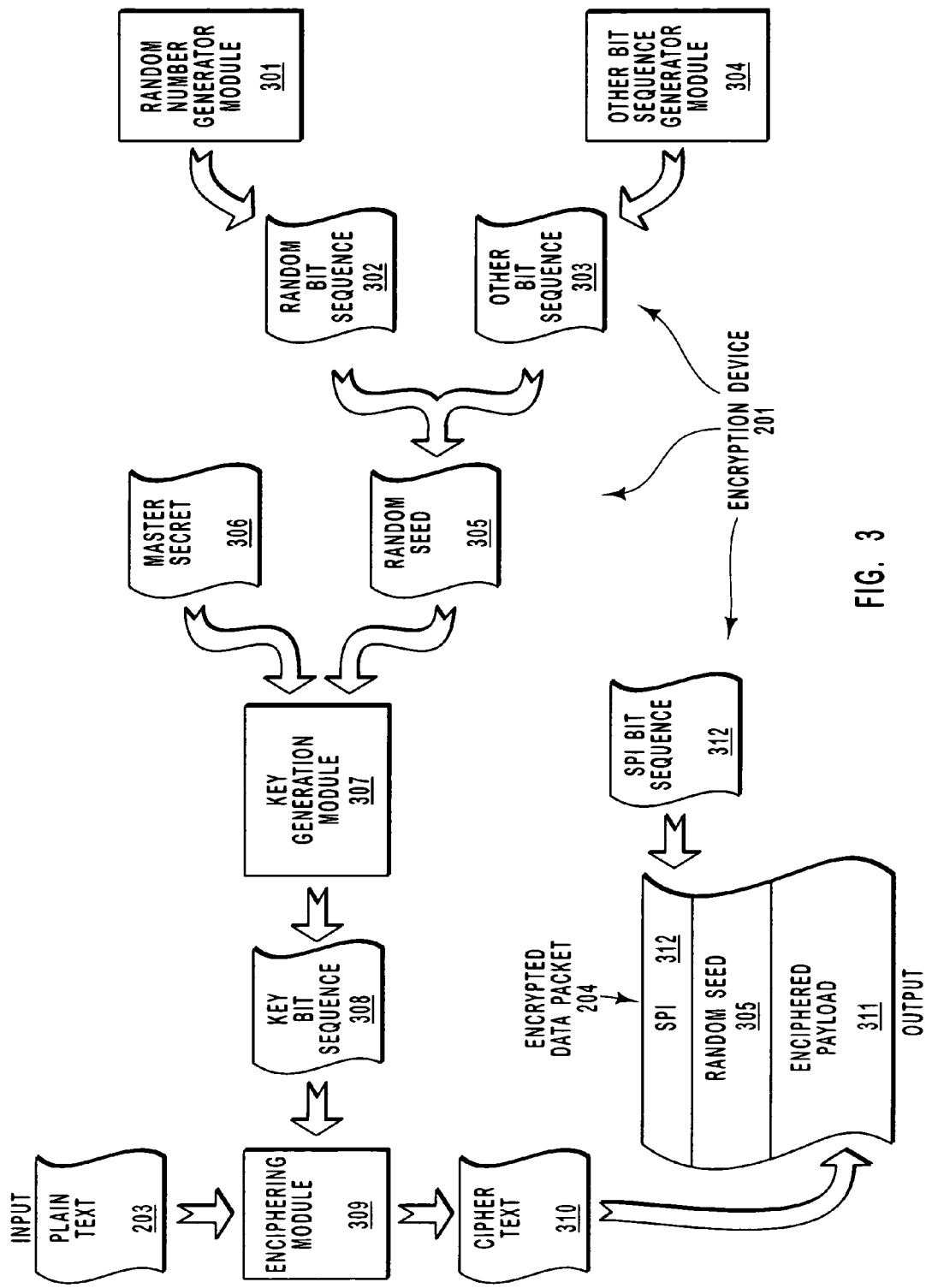
FIG. 3 schematically illustrates the components and data flow of the encryption device of FIG. 2.

FIG. 3 illustrates at least some of the components and data flow of the encryption device 201 which may be used to generate a security key (e.g., an encryption key) in a unique and useful fashion for improved security in accordance with the present invention. The components and data flow of the encryption device 201 will be described with frequent reference to FIG. 3 which shows the components and data flow of the encryption device 201, as well as FIG. 4 which is a flowchart that illustrates the operation of encryption device 201.

Figure 4:
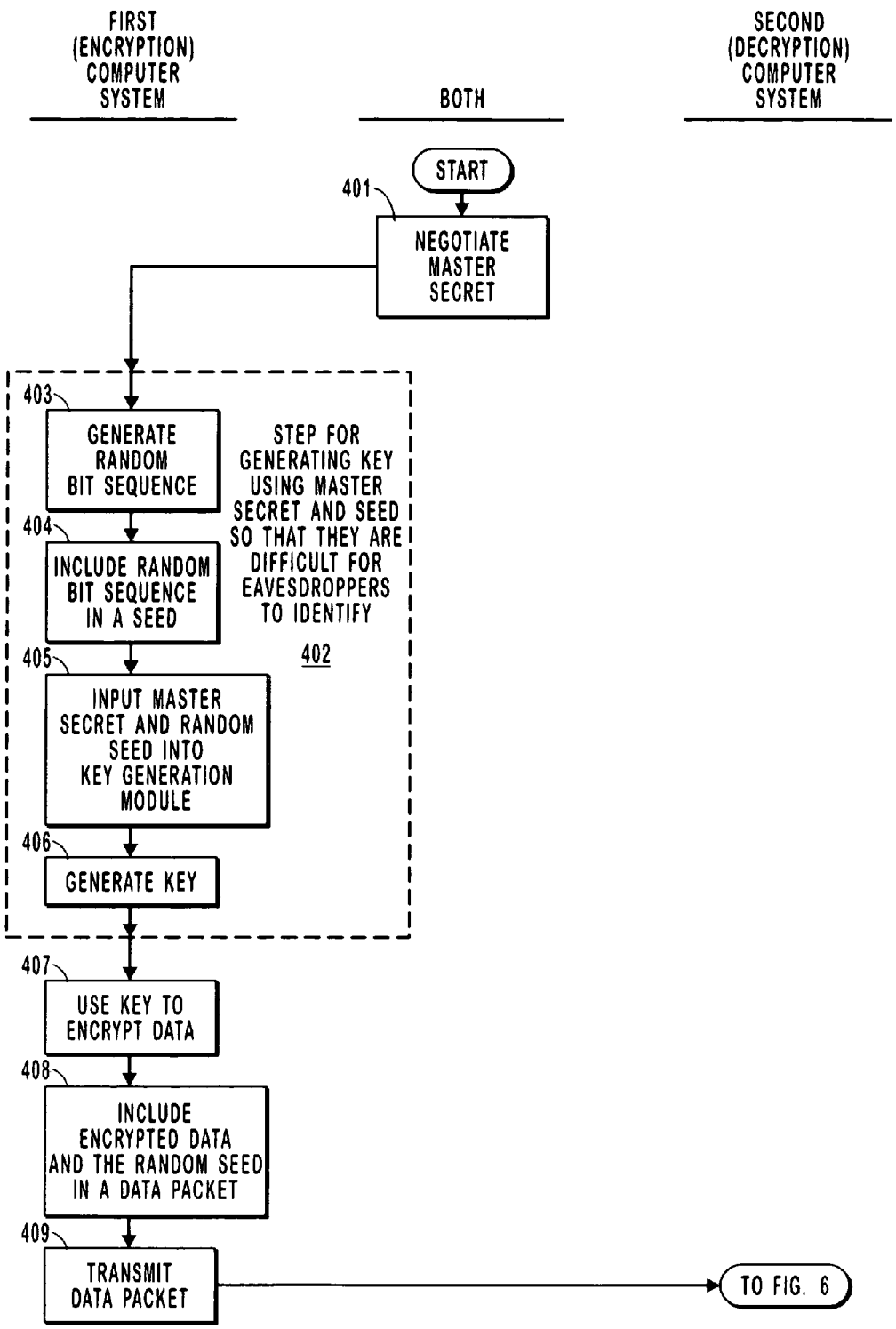
FIG. 4 illustrates a flowchart of a method for encrypting data that is implemented by the encryption device of FIG. 2.

Some acts in the method of FIG. 4 are performed by the first (encryption) computer system as listed under the left column having the heading FIRST (ENCRYPTION) COMPUTER SYSTEM, some acts are perform by the second (decryption) computer system as listed under the right column having the heading SECOND (DECYPTION) COMPUTER SYSTEM, and some act are performed by both computer systems as listed under the middle column having the heading BOTH.

As illustrated by FIG. 4, before secure communications begin, the first and second computer system securely negotiate a master secret (act 401) that is to be known by only the first and second computer systems. Other parameters such as a Security Parameter Index (SPI), a parameter expiry, and an algorithm suite may also be negotiated in the same session. Technology for securely negotiating a master secure are well known in the art and may include using asymmetric encryption technology.

In asymmetric encryption, communication occurs in either direction by the transmitting computer system encrypting a message using a public key specific to the receiving computer system, the public key being generally known. The encryption algorithm is asymmetric in the sense that although the public key may be used to encrypt a message, the message cannot be decrypted using that same public key, but may only be decrypted using a private key that is known only to the receiving computer system. Thus, the encrypted message may be securely transmitted to the receiving computer system over a public network, even though the message was encrypted using a public key that is generally known. The communication may occur in the opposite direction as well in the same manner until a master secret is securely negotiated. At that point, lower overhead symmetric encryption algorithms may be used in which the same key that is used to encrypt data is used to decrypt the data.

Once the master secret is negotiated (act 401), the encryption device 201 implements a step for generating a key using the master secret and a seed so that the master secret and the key are difficult for eavesdroppers to identify (step 402). Acts corresponding to this step are illustrated in FIG. 4 as act 403, act 404, act 405 and act 406.

In particular, the encryption device generates a random bit sequence (act 403). Referring to FIG. 3, this may be accomplished by a cryptographically secure random number generator module 301, which generates random bit sequence 302. In one embodiment, the random bit sequence is 8 bytes or 64 bits long.

Next, the random bit sequence 302 is included in a seed to generate a random seed (act 404). In this description and in the claims, a "random seed" is defined as a bit sequence that is used to generate a security key bit sequence and that includes a random bit sequence. Referring to FIG. 3, the random bit sequence 302 may be combined with another bit sequence 303 generated by other bit sequence generator module 304 in order to form random seed 305. In one embodiment, the other bit sequence 303 is four bytes representing current Universal Time Coordinated (UTC) time in seconds since the UNIX epoch began. The UNIX epoch began on exactly midnight on the morning of Jan. 1, 1970. The four-byte UTC time combined with the eight-byte random bit sequence forms a random seed of 12 bytes or 96 bits.

The random seed and the master secret are then input into a key generation module (act 405), which then generates a key (act 406). Referring to FIG. 3, random seed 305 and master secret 306 are input into key generation module 307 to generate key bit sequence 308. The master secret 306 was negotiated by the first and second computer systems in act 401. The identity of the key generation module 307 may also be negotiated during the same initial session in which the master secret is negotiated. The key generation module 307 may be any module capable of generating a cryptographically secure key using a seed and a master secret.

One example of such a module or function is the pseudo random function described in the Transport Layer Security (TLS) protocol. Specifically, the TLS protocol pseudo random function called "PRF" takes as its input the master secret (also called simply "secret"), a seed (i.e., the "random" seed if implementing the present invention), and an identifying label. Based on these inputs, the function PRF produces an output of arbitrary length. For increased security, the function PRF of the TLS protocol uses two hash algorithms in a way which should guarantee its security if either algorithm remains secure.

Since the pseudo random function described in the TLS protocol is defined using a function HMAC, the definition of HMAC is first described herein. HMAC is also described in RFC 2104. HMAC can be used with a variety of different hash algorithms including the well-known MD5 and SHA-1 hash algorithms. When using the MD5 hash algorithm, the function HMAC is denoted as HMAC_MD5(secret, text). When using the SHA-1 hash algorithm, the function HMAC is denoted as HMAC_SHA(secret, text). The algorithm receives as its first input "secret" which in the present invention may be the master secret. The algorithm receives as its second input some bit sequence "text".

These hash algorithms operate by iterating a basic compression function on blocks of data. The byte-length of such blocks is denoted herein as "B" where B is 64 for both MD5 and SHA-1. The byte-length of the hash outputs is denoted herein as "L" where L equals 16 for the MD5 hash algorithm, and L equals 20 for the SHA-1 hash algorithm. The master secret or "secret" can be of any length up to B bytes, the block length of the hash function. For clarity in defining HMAC, two fixed and different strings ipad and opad are defined as follows (the 'i' and 'o' are mnemonics for inner and outer):

ipad=the byte 0×36 repeated B times; and opad=the byte 0×5C repeated B times.

To compute HMAC over the second input "text", the following seven steps are performed.

Step (1): Zeros are appended to the end of the first input "secret" to create a B byte string. For example, if the master secret is of length 20 bytes and B is equal to 64, then the master secret will be appended with 44 zero bytes 0×00 to create a 64 byte string.

Step (2): XOR (bitwise exclusive-OR) the B byte string computed in step (1) with ipad.

Step (3): Append the second input "text" to the B byte string resulting from step (2).

Step (4): Apply the appropriate hash algorithm to the stream generated in step (3). For example, for the function HMAC_MD5(secret, text), the stream is hashed using the well-known MD5 hash algorithm. For the function HMAC_SHA(secret, text), the stream is hashed using the well-known SHA-1 hash algorithm.

Step (5): XOR (bitwise exclusive-OR) the B byte string computed in step (1) with opad.

Step (6): Append the hashed result from step (4) to the B byte string resulting from step (5).

Step (7): Apply the appropriate hash algorithm to the stream generated in step (6) and output the result.

Now that HMAC has been described, a data expansion function, P_hash(secret, data) is defined. The data expansion function P_hash (secret, data) uses a single hash function to expand a secret and seed into an arbitrary quantity of output. This function is defined as follows:

P_hash(secret, seed)=HMAC_hash(secret, A(1)+seed)+HMAC_hash(secret, A(2)+seed)+HMAC_hash(secret, A(3)+seed)+and so forth until the desired output length is achieved.

In this definition, the addition symbol "+" indicates concatenation. Thus, the output of the function P_hash(secret, seed) is a concatenation of outputs from the function HMAC_hash. In this definition, A(i) is defines as equal to HMAC_hash(secret, A(i-1)) where A(0) is equal to the seed.

P_hash can be iterated as many times as is necessary to produce the required quantity of data. For example, if P_SHA-1 (described below) was being used to create 64 bytes of data, it would have to be iterated 4 times (through A(4)), creating 80 bytes of output data; the last 16 bytes of the final iteration would then be discarded, leaving 64 bytes of output data.

The pseudo random function in the TLS protocol is created by splitting the master secret into two halves and using one half (called herein "S1") to generate data with P_MD5 (i.e., P_hash where HMAC_hash is HMAC_MD5) and the other half to generate data with P_SHA-1 (i.e., P_hash where HMAC_hash is HMAC_SHA). The results of P_MD5 and P_SHA are the bit wise exclusive-or'ed.

S1 and S2 are the two halves of the master secret and each is the same length. S1 is taken from the first half of the secret, S2 from the second half. Their length is created by rounding up the length of the overall secret divided by two; thus, if the original secret is an odd number of bytes long, the last byte of S1 will be the same as the first byte of S2. For example, if L_S is the overall length of the secret in bytes, then the length of the first half L_S1 is equal to the length of the second half L_S2 which are both equal to (L_S/2) rounded up. S1 is obtained by taking the first L_S1 bytes of the secret; and S2 is obtained by taking the last L_S2 bytes of the secret.

The pseudo random function described in the TLS specification receives as inputs the master secret, a label, and a seed. This pseudo random function PRF(secret, label, seed) is defined as follows.

PRF(secret, label, seed)=
P_MD5(S1, label+seed) XOR
P_SHA-1(S2, label+seed);

The label is an ASCII string. It should be included in the exact form it is given without a length byte or trailing null character. For example, the label "slithy toves" would be processed by hashing the following bytes as represented in hexadecimal format:

73 6C 69 74 68 79 20 74 6F 76 65 73

Note that because MD5 produces 16 byte outputs and SHA-1 produces 20 byte outputs, the boundaries of their internal iterations will not be aligned. To generate a 80 byte output will involve P_MD5 being iterated through A(5), while P_SHA-1 will only iterate through A(4).

The above describes a pseudo random function in accordance with the TLS protocol which may be implemented by the key generation module 307. In another example, the key generation module may implement the pseudo random function described in the Wireless Transport Layer Security (WTLS) protocol. WTLS differs from TLS in that in the TLS standard, two hash algorithms (i.e., MD5 and SHA-1) were used in order to make the pseudo random function as secure as possible. In order to save resources, the pseudo random function of WTLS uses only one hash algorithm which is initially negotiated at the time the master secret is negotiated. The pseudo random function PRF of WTLS is defined as follows:

PRF(secret, label, seed)=P_hash(secret, label+seed)

where the addition symbol "+" indicates concatenation,
where P_hash is P_MD5 if the MD5 hash algorithm is employed; and
where P_hash is P_SHA-1 if the SHA-1 hash algorithm is employed.

Note that the entire master secret is passed into the P_hash function rather than dividing the master secret into two halves.

After the key is generated (act 406), the generated key 308 is then provided to an enciphering module 309 which uses the key to encrypt the plain text 203 to thereby form cipher text 310 (act 407). The identification of the enciphering and deciphering modules may also be negotiated during the same initial session in which the master secret is negotiated.

Next, the encrypted data (i.e., cipher text 310) and the random seem 305 are included in the encrypted data packet 204 (act 408). Specifically, the cipher text 310 is included as part of an enciphered payload 311. A Secure Parameter Index (SPI) is a 96 bit (12 byte) bit sequence that is unique to the second computer system. The SPI may be included to ensure compatibility with the Encapsulation Security Payload (ESP) protocol of the Internet Protocol Security (IPSec) protocol although such an index is not required if other data packet formats are used.

Figure 5:
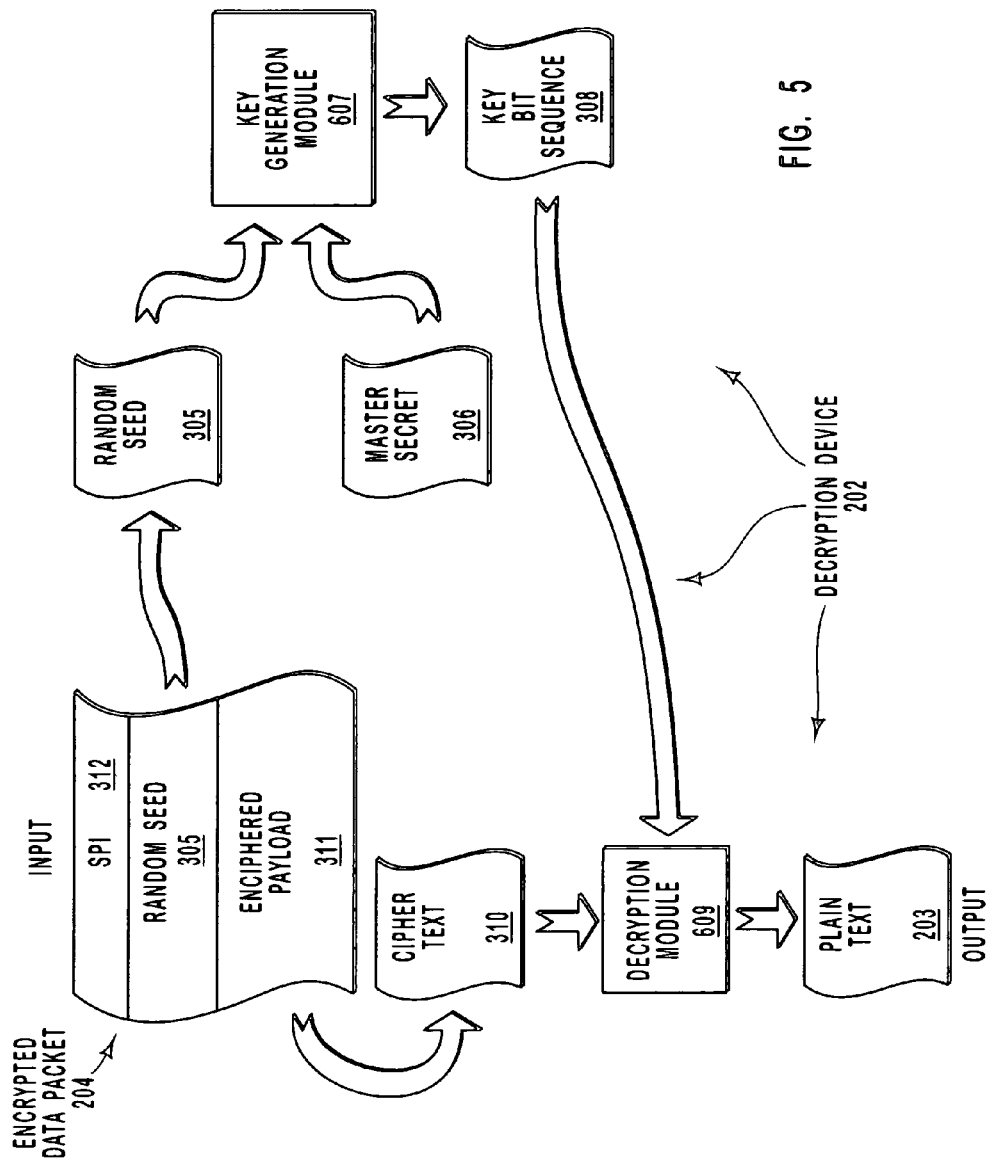
FIG. 5 schematically illustrates the components and data flow of the decryption device of FIG. 2.
Figure 6:
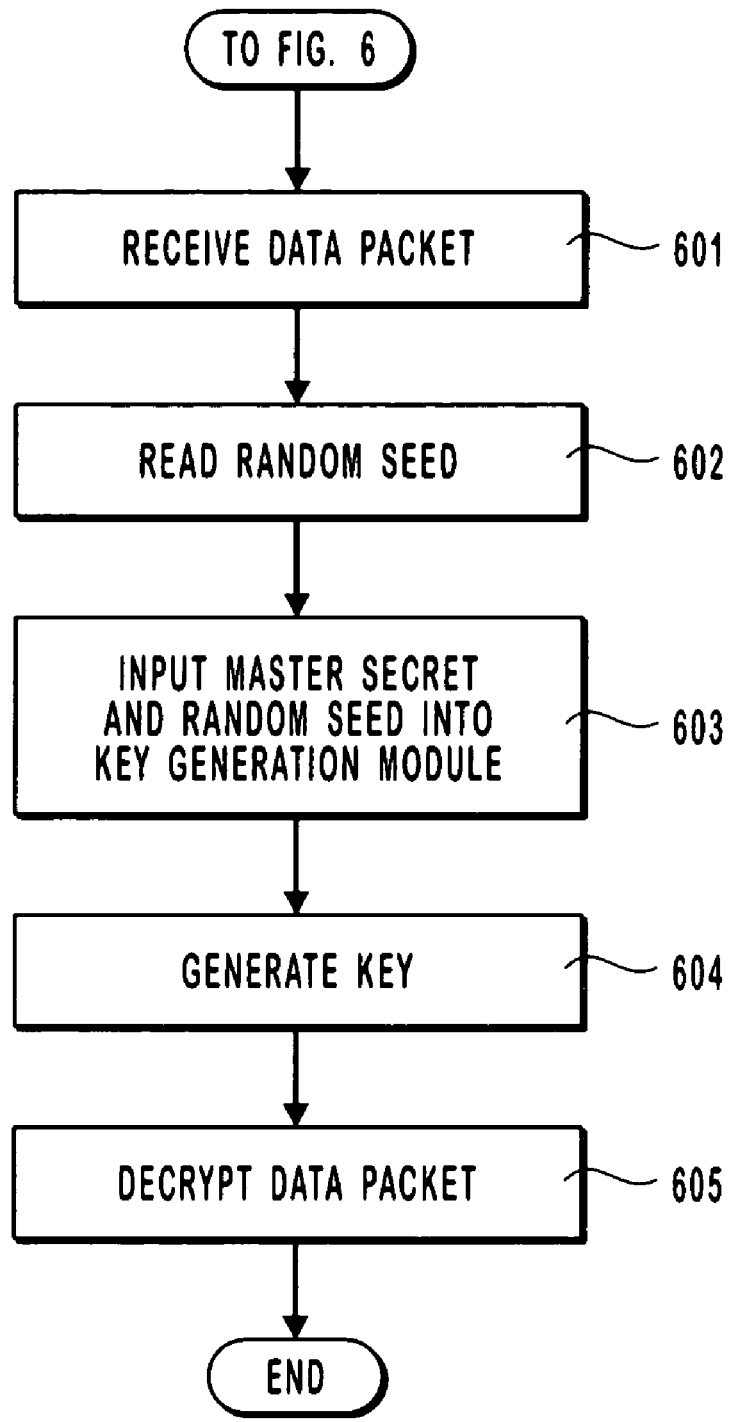
FIG. 6 illustrates a flowchart of a method for decrypting data that is implemented by the decryption device of FIG. 2.

The data packet 204 is then transmitted to the second computer system (act 409) for decryption by the decryption device 202. The functions and data flow of the description device are schematically shown in FIG. 5, whereas a corresponding flowchart describing the decryption is illustrated in FIG. 6. Both FIG. 5 and FIG. 6 will be referred to frequently in describing the decryption process.

First, the decryption device 202 receives the encrypted data packet 204 (act 601) and then reads the plain text random seed 305 from the data packet 204 (act 602). The negotiated master secret 306 as well as the random seed 305 are then input to the key generation module 607 (act 603). The key generation module 607 at the decryption device 202 performs the same key generation algorithm as was performed by the key generation module 307 at the encryption device 201. Since the key generation function is identical, and the inputs to that function are identical to those used at the encryption device 201, the key generation module 607 generates the same key bit sequence 308 that was used to encrypt the data packet (act 604). The key is then supplied to a decryption module 609. Since the decryption module 609 is cryptographically symmetric with the encryption module 309, the key is then be used to decrypt the cipher text 310 (act 605) from the data packet 204 to thereby regenerate the plain text 203 that was initially encrypted at the encryption device 201.

One advantage of the present invention is that the seed used to generate the key contains a random bit sequence. This makes it more difficult for an eavesdropper to identify the encryption key or master secret to thereby be able to decrypt and successfully intercept a sensitive message.

In one embodiment of the invention, a new random bit sequence is generated for each data packet transmitted from the first computer system to the second computer system. This means that the random seed and thus the encryption key will be different for each data packet. Thus, even if the eavesdropper identifies the encryption key for one data packet, the eavesdropper would not automatically be able to intercept other data packets without having to break another encryption key. Thus, the principles of the present invention not only make it more difficult to break a key, but they also reduce the reward for having broken a key.

The master secret is more difficult to break than would be any individual key. Still, if the eavesdropper were somehow able to identify the master secret, the eavesdropper could decrypt any data packets that were encrypted using a key that is based on the master secret. To reduce the risk of damage caused by detection of the master secret, the first and second computer systems may initially negotiate a parameter expiry identifying the valid lifetime of the master secret. Once the master secret lifetime has expired, the first and second computer system would then securely renegotiate another master secret.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system, comprising a first computing system in a network system that includes the first computer system network connectable to a second computer system, the first computing system capable of encrypting data, the first computing system comprising a processor for processing computer-executable instructions stored on one or more computer-readable media of the computing system and that are configured for implementing a method of the first computer system encrypting data so as to guard against eavesdropping and brute force attacks, the method comprising the following:

an act of securely negotiating a master secret with the second computer system for a plurality of data packets to be transmitted from the first computer system to the second computer system;

an act of generating a random bit sequence for each data packet, the random bit sequence being different for each data packet;

an act of including the random bit sequence, for each data packet, into a seed to generate a random seed that is different for each data packet;

for each data packet, an act of inputting the master secret and the random seed corresponding to each data packet into a key generation module to generate a corresponding key, such that the corresponding key is different for each data packet;

for each data packet, an act of using the corresponding key to encrypt the corresponding data packet; and for each data packet, an act of including the encrypted data packet and the corresponding random seed in a data structure that is transmitted from the first computer to the second computer.

2. A computing system in accordance with claim 1, wherein the data structure is a data packet, the method further comprising an act of transmitting the data packet in accordance with a protocol.

3. A computing system in accordance with claim 2, wherein the data packet includes a Security Parameter Index in accordance with the Encapsulating Security Payload (ESP) protocol.

4. A computing system in accordance with claim 1, wherein the method further comprises an act of negotiating a parameter expiry with the second computer system, the parameter expiry indicating the lifetime of the master secret.

5. A computing system in accordance with claim 4, wherein upon expiration of the lifetime of the master secret, performing an act securely renegotiating a master secret with the second computer system.

6. A computing system in accordance with claim 1, wherein the second computer system comprises a wireless device.

7. A computing system in accordance with claim 1, wherein the act of generating a random bit sequence is performed by a cryptographically secure random number generator.

8. A computing system in accordance with claim 1, wherein the method further comprises an act of including, in the random seed, a bit sequence that represents the current time.

9. A computing system in accordance with claim 1, wherein the random seed is at least 96 bits.

10. A computing system, comprising a first computing system in a network system that includes the first computer system network connectable to a second computer system, the first computing system being capable of encrypting data, the first computing system comprising a processor for processing computer-executable instructions stored on one or more computer-readable media of the computing system and that are configured for implementing a method of the first computer system encrypting data so as to guard against eavesdropping and brute force attacks, the method comprising the following:

an act of securely negotiating a master secret with the second computer system;

a step for generating a different encryption key, for each corresponding data packet transmitted between the first and second computer systems, using the master secret and a different random seed for each data packet;

an act of using the different encryption keys to encrypt the corresponding data packets; and an act of transmitting the encrypted data packets to the second computer system, each data packet being transmitted with the different random seed that was used to generate the encryption key corresponding to each data packet.

11. A computing system in accordance with claim 10, wherein the data structure is a data packet, the method further comprising an act of transmitting the data packet in accordance with a protocol to the second computer system.

12. A computing system in accordance with claim 10, wherein the second computer system comprises a wireless device.

13. A computing system in accordance with claim 10, wherein the method further comprises an act of including, in the random seed, a bit sequence that represents the current time.

14. A computing system in accordance with claim 10, wherein the step for generating a key using the master secret and the random seed comprises the following:

an act of generating a random bit sequence;

an act of including the random bit sequence in a seed to generate the random seed; and an act of inputting the master secret and the random seed into a key generation module to generate a key.

15. A computer program product for use in a network system that includes a first computer system network connectable to a second computer system, the first computer system capable of encrypting data, the computer program product comprising one or more computer-readable media having computer-executable instructions for implementing a method of the first computer system encrypting data so as to guard against eavesdropping and brute force attacks, the method comprising the following:

an act of securely negotiating a master secret with the second computer system;

a step for generating a different encryption key, for each corresponding data packet transmitted between the first and second computer systems, using the master secret and a different random seed for each data packet;

an act of using the different encryption keys to encrypt the corresponding data packets; and an act of transmitting the encrypted data packets to the second computer system, each data packet being transmitted with the different random seed that was used to generate the encryption key corresponding to each data packet.

16. A computing system, comprising a second computer system in a network system that includes a first computer system network connectable to the second computer system, wherein said computing system comprises a processor for processing computer-executable instructions stored on one or more computer-readable media of the computing system and that are configured for implementing a method of the computing system decrypting a data packet that was transmitted to the second computer system by the first computer system, the data packet being encrypted so as to guard against eavesdropping and brute force attacks, the method comprising the following:

an act of securely negotiating a master secret with the first computer system;

an act of receiving a plurality of encrypted data packets from the first computer system wherein the first computer system encrypts every data packet with a different key based on a different random seed, such that each encrypted data packet received by the second computer system is encrypted with a different key based;

an act of reading a random seed from at least one of the data packets;

an act of inputting the master secret and the random seed into a key generation module to generate a key; and an act of using the key to decrypt the data packet.

17. A computing system in accordance with claim 16, further comprising an act of negotiating a parameter expiry with the first computer system, the parameter expiry indicating the lifetime of the master secret.

18. A computing system in accordance with claim 17, wherein upon expiration of the lifetime of the master secret, performing an act securely renegotiating a master secret with the first computer system.

19. A computing system in accordance with claim 18, wherein the second computer system comprises a wireless device.

\* \* \* \* \*